United States Patent [19]

Emsperger

[11] Patent Number: 5,272,867
[45] Date of Patent: Dec. 28, 1993

[54] METHOD AND PLANT FOR REDUCING THE NITROGEN OXIDE EMISSIONS OF A GAS TURBINE

[75] Inventor: Werner Emsperger, Erlangen, Fed. Rep. of Germany

[73] Assignee: Siemens Aktiengesellschaft, Munich, Fed. Rep. of Germany

[21] Appl. No.: 916,026

[22] Filed: Jul. 17, 1992

[30] Foreign Application Priority Data

Jul. 18, 1991 [DE] Fed. Rep. of Germany ....... 4123908

[51] Int. Cl.$^5$ .............................. F02C 7/00; F02C 7/16
[52] U.S. Cl. ..................................... 60/39.02; 60/39.5
[58] Field of Search ............... 60/39.02, 39.12, 39.182, 60/39.5, 39.06, 39.17, 39.54, 39.58

[56] References Cited

U.S. PATENT DOCUMENTS

| | | | |
|---|---|---|---|
| 3,975,900 | 8/1976 | Pfefferle | 60/723 |
| 4,160,805 | 7/1979 | Inaba et al. | 60/39.182 |
| 4,353,207 | 10/1982 | Lee | 60/39.182 |
| 4,682,468 | 7/1987 | Dean et al. | 60/39.02 |

FOREIGN PATENT DOCUMENTS

| | | | |
|---|---|---|---|
| 18513 | 2/1977 | Japan | 60/39.5 |
| 13015 | 2/1978 | Japan | 60/39.5 |

*Primary Examiner*—Louis J. Casaregola
*Attorney, Agent, or Firm*—Herbert L. Lerner; Laurence A. Greenberg

[57] ABSTRACT

A method for reducing nitrogen oxide emissions of a gas turbine includes supplying a working medium produced in a combustion chamber with admixture of compressed air to a gas turbine, supplying a coolant to the gas turbine, and admixing a reducing agent with the coolant to reduce nitrogen oxides. A gas turbine plant includes a gas turbine, a combustion chamber connected upstream of the gas turbine, a compressor connected upstream of the combustion chamber, and a coolant line for delivering coolant to the gas turbine. A reducing agent is admixed with the coolant in the gas turbine for reducing nitrogen oxides.

10 Claims, 1 Drawing Sheet

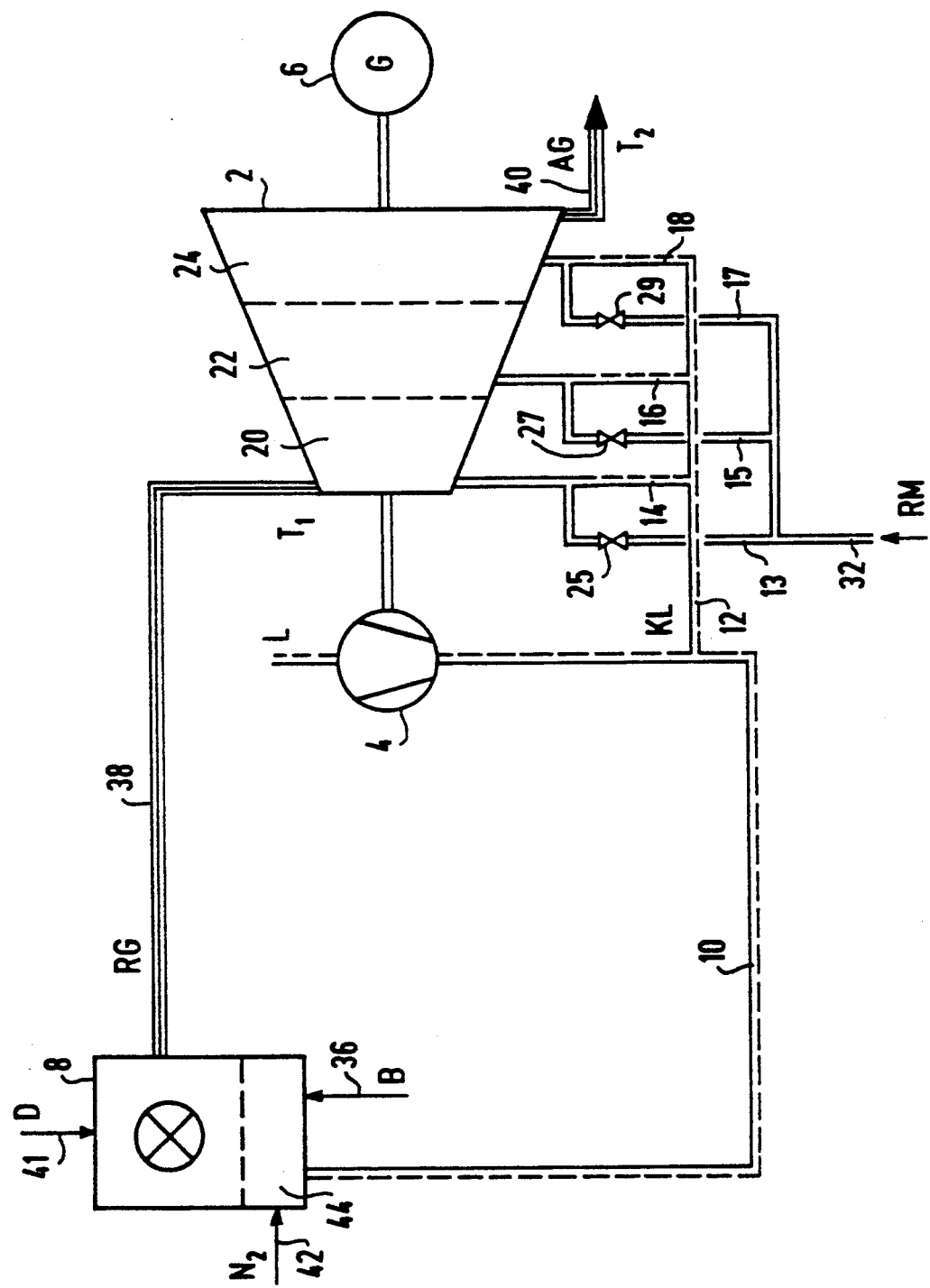

METHOD AND PLANT FOR REDUCING THE NITROGEN OXIDE EMISSIONS OF A GAS TURBINE

The invention relates to a method for reducing the nitrogen oxide emissions of a gas turbine, which is supplied with a working medium that is generated in a combustion chamber while compressed air is supplied, and a coolant.

In the operation of a gas turbine in a gas turbine plant, a reduction in the formation of nitrogen oxides ($NO_x$) is typically sought even in the course of generation of the working medium in the combustion chamber. To this end, various methods are already known that are carried out either separately or in a suitable combination with one another as a function of the fuel being used, such as natural gas, crude oil or coal. If a gaseous fuel is used, then it is already mixed with the compressed air which is necessary for producing the working medium before ignition in the combustion chamber. Another option is to mix steam in with the fuel in the combustion chamber. In a method that is preferably employed in a combined gas and steam turbine plant with coal gasification, nitrogen that is produced in the process itself is admixed with the fuel in the combustion chamber. Through the use of such methods, the proportion of the nitrogen oxides in the working fluid is kept low even during its production, by providing that the combustion temperature is lowered, so that local temperature peaks as a source for the formation of thermal nitrogen oxides are avoided.

Due to the increasing gas turbine capacity in the course of development, that is achieved by increasing the temperature of the working medium, which in turn is made possible, for instance, by cooling the turbine blades with a coolant, a limit is finally reached for the aforementioned provisions for reducing nitrogen emissions. It is then additionally necessary to incorporate a catalyzer in the exhaust gas flow of the gas turbine. In a combined gas and steam turbine plant, such a catalyzer is typically integrated into the steam generator. However, that entails additional expense for materials and other costs and is thus uneconomical.

It is accordingly an object of the invention to provide a method and a plant for reducing the nitrogen oxide emissions of a gas turbine, which overcome the hereinafore-mentioned disadvantages of the heretofore-known methods and devices of this general type and which use simple means to enable the least possible nitrogen oxide emissions to be produced in the operation of a gas turbine plant or a combined gas and steam turbine plant. The object is also to disclose a gas turbine plant that has not only the least possible proportion of nitrogen oxide in the exhaust gas of the gas turbine, but also has a high efficiency.

With the foregoing and other objects in view there is provided, in accordance with the invention, a method for reducing nitrogen oxide emissions of a gas turbine, which comprises supplying a working medium produced in a combustion chamber with admixture of compressed air to a gas turbine, supplying a coolant to the gas turbine, and admixing a reducing agent with the coolant to reduce nitrogen oxides.

Through the use of the reducing agent that is introduced along with the coolant into the gas turbine, at least some of the nitrogen oxides contained in the working medium are reduced to elementary nitrogen even inside the gas turbine. This affords an additional opportunity for keeping the proportion of nitrogen oxide in the gas turbine exhaust gas below the legally prescribed limit value.

In accordance with another mode of the invention, there is provided a method which comprises delivering the reducing agent to a gas turbine stage in which the temperature of the working medium is below the temperature at which the reducing agent combusts and thereby forms additional nitrogen oxides.

This is done in order to achieve effective use of the reducing agent in the gas turbine and it is necessary especially if the temperature of the working medium, as it enters the gas turbine, is above this reaction temperature of the reducing agent.

In accordance with a further mode of the invention, there is provided a method which comprises using ammonia ($NH_3$) as the reducing agent.

In accordance with an added mode of the invention, there is provided a method which comprises delivering steam to the combustion chamber, when a gaseous or liquid fuel is used to produce the working fluid. This is done in order to keep the proportion of nitrogen oxide in the working fluid as low as possible even before the working medium enters the gas turbine.

Alternatively, in accordance with an additional mode of the invention, there is provided a method which comprises mixing the fuel with the compressed air before combustion to avoid local overheating in the combustion chamber, particularly when a gaseous fuel is used to produce the working medium or fluid.

In accordance with yet another mode of the invention, there is provided a method which comprises delivering nitrogen to the combustion chamber, if coal gas is used to produce the working medium.

By combining one or more of these steps, which are known per se, with the method of the invention, a synergistic effect arises, which particularly advantageously effects further reduction in the nitrogen emissions at relatively little effort or expense.

In accordance with yet a further mode of the invention, there is provided a method which comprises using some of the compressed air as coolant.

With the objects of the invention in view, there is also provided a gas turbine plant, comprising a gas turbine, a combustion chamber connected upstream of the gas turbine, a compressor connected upstream of the combustion chamber, a coolant line for delivering coolant to the gas turbine, and means for admixing a reducing agent with the coolant in the gas turbine for reducing nitrogen oxides.

In accordance with another feature of the invention, the coolant line is connected to the pressure side of the compressor, so that no additional coolant needs to be furnished.

In accordance with a concomitant feature of the invention, the combustion chamber includes a premixing stage.

Other features which are considered as characteristic for the invention are set forth in the appended claims.

Although the invention is illustrated and described herein as embodied in a method and a plant for reducing the nitrogen oxide emissions of a gas turbine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The single drawing figure is a schematic circuit diagram of a gas turbine plant according to an exemplary embodiment of the invention, with a cooling air line into which a reducing agent can be fed.

Referring now to the single figure of the drawing in detail, there is seen a gas turbine plant which includes a gas turbine 2 with an air compressor 4 coupled thereto and a generator 6, along with a combustion chamber 8 connected upstream of the gas turbine 2. The air compressor 4 is located in a line 10 that discharges into the combustion chamber 8.

A cooling air line 12 is connected to the line 10 on the pressure side of the air compressor 4 and discharges through respective branches 14, 16 and 18 into first, second and third stages 20, 22 and 24 of the gas turbine 2. Lines 13, 15 and 17 are connected to the branches 14, 16 and 18 and communicate with a common line 32 for supplying a reducing agent RM. Individual devices or valves 25, 27 and 29 are incorporated into the respective lines 13, 15 and 17.

During operation of the gas turbine plant, the combustion chamber 8 is supplied through a fuel line 36 with fuel B, such as natural gas or coal gas, from a non-illustrated coal gasification plant. The fuel B is combusted in the combustion chamber 8 with compressed air L from the air compressor 4. Hot flue gas RG produced in the course of combustion serves as a working medium and is carried into the gas turbine 2 through a flue line 38. In the gas turbine 2, the flue gas RG expands and in so doing drives the turbine 2. The turbine then in turn drives the air compressor 4 and the generator 6. The working medium or flue gas RG has a high temperature $T_1$, in particular of more than 1100° C., upon entering the gas turbine 2, or in other words upon entering the first stage 20. The temperature of the working medium RG decreases over the stages 20, 22 and 24, and at the end of the stage 24, for instance, it is still at a temperature $T_2$ of approximately 550° C. At this temperature $T_2$ of approximately 550° C., the working medium RG leaves the turbine 2 through an exhaust gas line 40 in the form of exhaust gas AG, in the direction of a non-illustrated chimney. The exhaust gas AG can also be used in a known manner to generate steam in a waste heat steam generator of a steam turbine plant.

The working medium or flue gas RG that is expanded in stages in the gas turbine 2 over the stages 20, 22 and 24 and cools down in the process, receives cooling air KL, in particular cooling air KL flowing away from guide blades and turning blades, which serves as coolant in the higher-temperature region. The location and the quantity of the cooling air KL to be fed in is dependent on the operating temperature $T_1$.

Through the use of the cooling air KL, the reducing agent RM, for instance ammonia, that is supplied through the line 32, is introduced into the gas turbine 2. The reducing agent RM mixes with the cooling air KL before entering the gas turbine 2 and with the working medium RG in the gas turbine 2. By suitably adjusting the valves 25, 27 or 29, one of the stages 20, 22 or 24, which is in a temperature range that is favorable for the reduction depending on the entry temperature $T_1$, is acted upon with the mixture of cooling air KL and reducing agent RM. The maximum temperature of the working medium RG in the applicable stage 20, 22 or 24 should be within the range of the reaction temperature of the reducing agent RM with the nitrogen oxides.

This means that at a high entry temperature $T_1$ of the working medium RG of 1100° C., for example, only cooling air KL is supplied to the first stage 20, with the valve 25 closed. The reducing agent RM is then not delivered until the second stage 22, or optionally the third stage 24, along with the cooling air KL flowing through the branches 16 and 18, with the valves 27 and 29 open. In each case, it must be assured that the temperature of combustion of the reducing agent RM is not exceeded. In that reaction, when ammonia is used, nitrogen and water are produced. In order to achieve a reduction of the proportion of nitrogen oxides even upon the production of the working medium RG in the combustion chamber 8, the combustion chamber 8 is supplied with steam D through a line 41, or nitrogen $N_2$ through a line 42, depending on the fuel B being used. In order to achieve mixing of the combustion air or fresh air L and fuel B before the ignition in the combustion chamber 8, the combustion chamber is connected downstream of a premixing stage 44, for example a premixing burner.

I claim:

1. A method for reducing nitrogen oxide emissions of a gas turbine, which comprises:
   supplying a working medium produced in a combustion chamber with admixture of compressed air to a gas turbine;
   supplying a coolant to the gas turbine; and
   adding a reducing agent for reducing nitrogen oxides to the coolant and admixing the coolant together with the reducing agent to the working medium in the gas turbine.

2. The method according to claim 1, which comprises selecting a reducing agent having a given combustion temperature, and supplying the reducing agent to a gas turbine stage in which a temperature of the working medium is below the given combustion temperature of the reducing agent.

3. The method according to claim 1, which comprises admixing ammonia with the coolant as the reducing agent.

4. The method according to claim 1, which comprises supplying steam to the combustion chamber when a fuel selected from the group consisting of gaseous fuel and liquid fuel is used to produce the working medium.

5. The method according to claim 1, which comprises supplying nitrogen to the combustion chamber when coal gas is used to produce the working medium.

6. The method according to claim 1, which comprises mixing fuel with the compressed air before the combustion in the combustion chamber, when a gaseous fuel is used to produce the working medium.

7. The method according to claim 1, which comprises supplying some of the compressed air to the gas turbine as the coolant.

8. A gas turbine plant, comprising:
   a gas turbine;
   a combustion chamber connected upstream of said gas turbine;
   a compressor connected upstream of said combustion chamber;
   a coolant line for delivering coolant to said gas turbine; and
   means for admixing a reducing agent with the coolant for reducing nitrogen oxides in said gas turbine.

9. The plant according to claim 8, wherein said compressor has a pressure side to which said coolant line is connected.

10. The plant according to claim 8, wherein said combustion chamber includes a premixing stage.

* * * * *